United States Patent
Gudapati et al.

(10) Patent No.: US 12,172,627 B2
(45) Date of Patent: *Dec. 24, 2024

(54) PARK PAWL CONTROL WITH REDUNDANT POWER SOURCES FOR E-SECUREMENT SYSTEMS FOR BATTERY ELECTRIC VEHICLES

(71) Applicant: FCA US LLC, Auburn Hills, MI (US)

(72) Inventors: Abhilash Gudapati, Troy, MI (US); Abhilash Valson, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 479 days.

This patent is subject to a terminal disclaimer.

(21) Appl. No.: 17/513,504

(22) Filed: Oct. 28, 2021

(65) Prior Publication Data

US 2023/0140511 A1    May 4, 2023

(51) Int. Cl.
 *B60W 20/50* (2016.01)
 *B60W 20/20* (2016.01)
 *B60W 20/30* (2016.01)

(52) U.S. Cl.
 CPC ............ *B60W 20/30* (2013.01); *B60W 20/20* (2013.01)

(58) Field of Classification Search
 CPC ...... B60W 20/30; B60W 20/20; B60W 10/08; B60W 10/182; B60W 10/26; B60W 2710/188; B60W 50/038; B60W 50/035; B60L 3/0046; B60L 3/0069; B60L 3/0084; B60L 3/0092; B60L 3/04
 See application file for complete search history.

(56) References Cited

U.S. PATENT DOCUMENTS

| | | | |
|---|---|---|---|
| 5,696,679 A * | 12/1997 | Marshall | F16H 63/3416 701/1 |
| 7,861,839 B2 * | 1/2011 | Schweiher | F16H 63/483 74/473.26 |
| 8,393,423 B2 | 3/2013 | Gwozdek et al. | |
| 9,205,813 B2 | 12/2015 | Yokota et al. | |
| 10,047,862 B2 * | 8/2018 | Tuhro | F16H 63/48 |
| 10,648,560 B2 | 5/2020 | Kokubu et al. | |
| 11,358,589 B1 * | 6/2022 | Gudapati | B60W 10/10 |
| 2003/0019702 A1 | 1/2003 | Goedecke et al. | |
| 2013/0060412 A1 * | 3/2013 | Nakagawara | B60T 17/221 701/22 |
| 2013/0152892 A1 * | 6/2013 | Hawkins | F01M 5/021 903/904 |
| 2018/0022335 A1 | 1/2018 | Kunz et al. | |
| 2018/0149268 A1 * | 5/2018 | Nakade | B60K 6/547 |
| 2022/0063591 A1 * | 3/2022 | Inoue | B60L 3/0046 |

* cited by examiner

*Primary Examiner* — Masud Ahmed
(74) *Attorney, Agent, or Firm* — Jeremy J. Klobucar

(57) ABSTRACT

A park electronic securement (e-securement) system for a battery electric vehicle (BEV) includes an electric vehicle control unit (EVCU) connected to a park pawl system of the BEV and configured to, when there is at least one of a plurality of malfunctions of an electrical system including a high voltage battery, a DC-DC converter, and a low voltage battery, receive power from a redundant power source voltage provided by the high voltage battery via the DC-DC converter and command either the park pawl system or an electric park brake to transition the BEV to a park state and, when there are none of the plurality of malfunctions of the electrical system, receive power from the low voltage battery for control of the park pawl system to transition the BEV to the park state when requested.

16 Claims, 4 Drawing Sheets

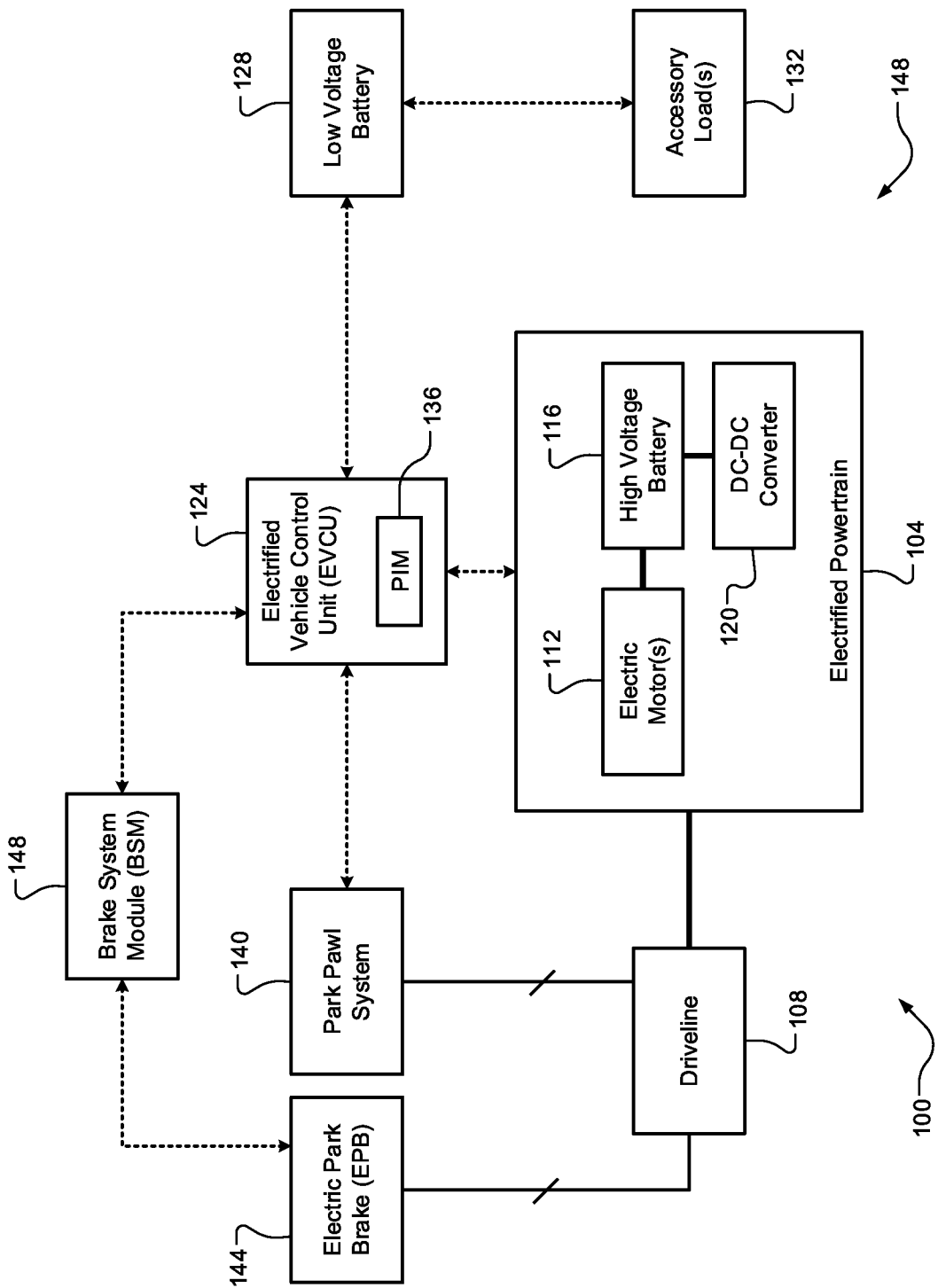

PARK PAWL CONTROL WITH REDUNDANT POWER SOURCES FOR E-SECUREMENT SYSTEMS FOR BATTERY ELECTRIC VEHICLES

FIELD

The present application generally relates to battery electric vehicles (BEVs) and, more particularly, to techniques for park pawl control with redundant power sources for electronic securement (e-securement) for BEVs.

BACKGROUND

A park pawl system comprises a park pawl that is selectively engaged/disengaged (e.g., to a toothed wheel) to physically lockup a driveline of a vehicle. In battery electric vehicles (BEVs), such as those including an electric drive module (EDM) for propulsion, park electronic securement (e-securement) can be a potential drivability issue. This may occur when the BEV is in drive/neutral/reverse and there is an electrical system malfunction that prevents the park pawl system from being controlled. Conventional solutions to this problem include the addition of excess hardware, such as additional electric motor(s) and spring loads, but this could significantly increase costs and cause packaging/weight issues and reduce reliability and longevity, which could be particularly problematic for lighter weight BEVs with less powerful propulsion systems. Accordingly, while such conventional park e-securement systems do work well for their intended purpose, there exists an opportunity for improvement in the relevant art.

SUMMARY

According to one example aspect of the invention, a park electronic securement (e-securement) system for a battery electric vehicle (BEV) is presented. In one exemplary implementation, the system comprises an electrical vehicle control unit (EVCU) configured to control operation of the BEV and comprising a power inverter module (PIM) for command of a park pawl system of the BEV, an electrical system comprising (i) a high voltage battery configured to power one or more electric motors of the BEV, (ii) a DC-DC converter configured to step-down a voltage of the high voltage battery to a redundant power source voltage, and (iii) a low voltage battery configured to power at least the EVCU, and a connection between the EVCU and the park pawl system, wherein the EVCU is configured to when there is at least one of a plurality of malfunctions of the electrical system, receive power from the redundant power source voltage and command either the park pawl system or an electric park brake to transition the BEV to a park state, and when there are none of the plurality of malfunctions of the electrical system, receive power from the low voltage battery for control of the park pawl system to transition the BEV to the park state when requested.

In some implementations, the EVCU is configured to command the electric park brake to transition the BEV to the park state when one of the plurality of electrical system malfunctions is present indicating the connection between the EVCU and the park pawl system is open or broken. In some implementations, the EVCU is configured to control the PIM to command the park pawl system to transition the BEV to the park state when one of the plurality of electrical system malfunctions is present indicating a ground short at the connection between the EVCU and the park pawl system. In some implementations, the EVCU is configured to control the PIM to command to the park pawl system to transition the BEV to the park state when one of the plurality of electrical system malfunctions is present indicating a ground short of the entire BEV. In some implementations, the connection comprises an H-bridge between the EVCU and the park pawl system, the H-bridge comprising four metal-oxide semiconductor field-effect transistors (MOSFETs). In some implementations, the system further comprises an isolating fuse between the first and second bridges. In some implementations, the isolating fuse is an approximately 200 ampere fuse. In some implementations, the redundant power source voltage and a voltage of the low voltage battery are each approximately 12 volts.

According to another example aspect of the invention, a park electronic securement (e-securement) method for a battery electric vehicle (BEV) is presented. In one exemplary implementation, the method comprises providing an electrical vehicle control unit (EVCU) configured to control operation of the BEV and comprising a power inverter module (PIM) for command of a park pawl system of the BEV, providing an electrical system comprising (i) a high voltage battery configured to power one or more electric motors of the BEV, (ii) a DC-DC converter configured to step-down a voltage of the high voltage battery to a redundant power source voltage, and (iii) a low voltage battery configured to power at least the EVCU, providing a connection between the EVCU and the park pawl system, detecting, by the EVCU, whether at least one of a plurality of malfunctions of the electrical system are present, when there is at least one of a plurality of malfunctions of the electrical system, receiving, by the EVCU, power from the redundant power source voltage and commanding, by the EVCU, either the park pawl system, via the PIM, or an electric park brake to transition the BEV to a park state, and when there are none of the plurality of malfunctions of the electrical system, receiving, by the EVCU, power from the low voltage battery for controlling, by the EVCU of the park pawl system to transition the BEV to the park state when requested.

In some implementations, the method further comprises commanding, by the EVCU, the electric park brake to transition the BEV to the park state when one of the plurality of electrical system malfunctions is present indicating the connection between the EVCU and the park pawl system is open or broken. In some implementations, the method further comprises commanding, by the EVCU via the PIM, the park pawl system to transition the BEV to the park state when one of the plurality of electrical system malfunctions is present indicating a ground short at the connection between the EVCU and the park pawl system. In some implementations, the method further comprises commanding, by the EVCU via the PIM, the park pawl system to transition the BEV to the park state when one of the plurality of electrical system malfunctions is present indicating a ground short of the entire BEV. In some implementations, the connection comprises an H-bridge between the EVCU and the park pawl system, the H-bridge comprising four metal-oxide semiconductor field-effect transistors (MOSFETs). In some implementations, the method further comprises providing an isolating fuse between the first and second bridges. In some implementations, the isolating fuse is an approximately 200 ampere fuse. In some implementations, the redundant power source voltage and a voltage of the low voltage battery are each approximately 12 volts.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

FIG. 1 is a functional block diagram of a battery electric vehicle (BEV) comprising an example park electronic securement (e-securement) system according to the principles of the present application;

DESCRIPTION

Figure 2A:
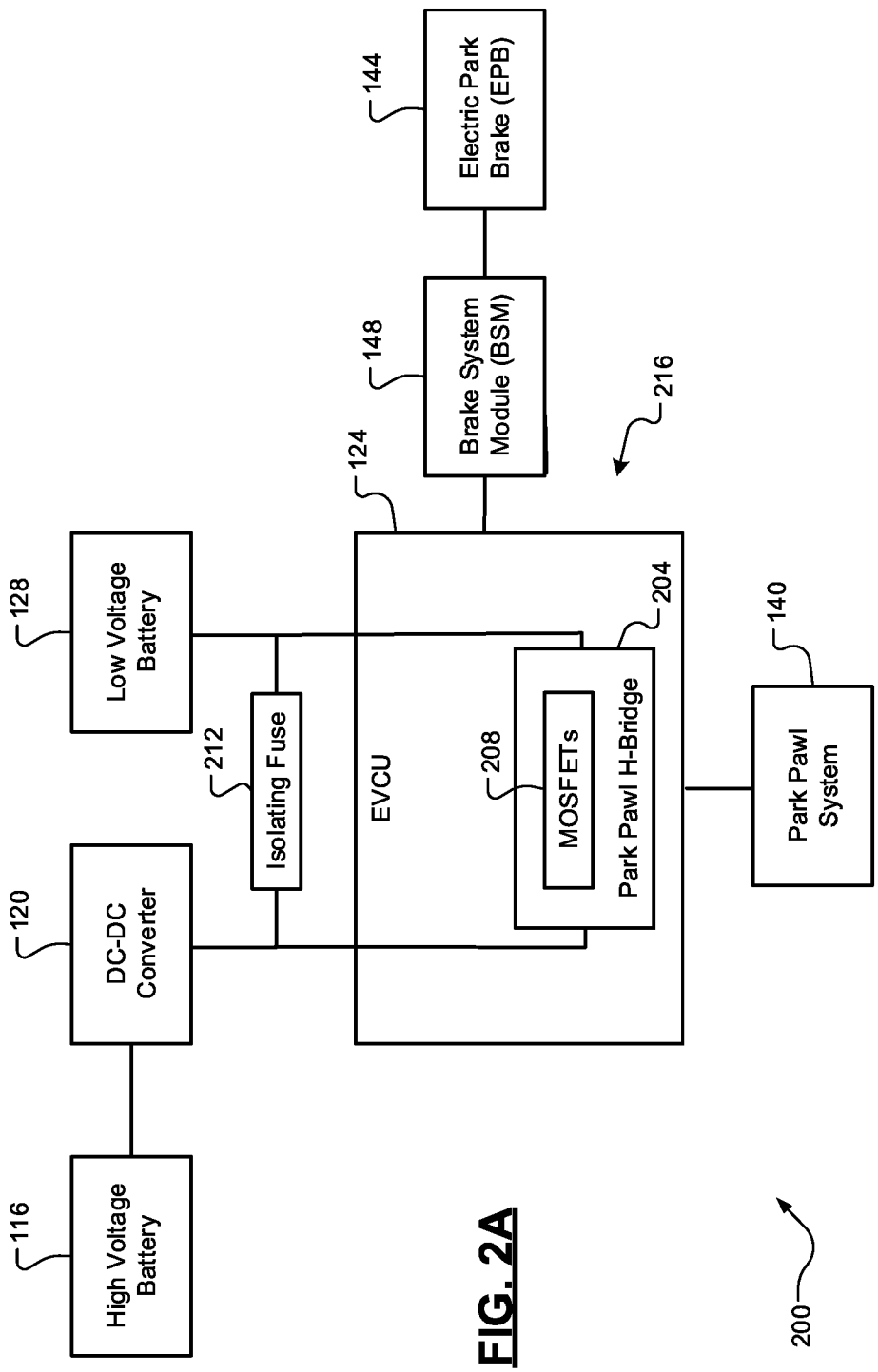
FIGS. 2A-2B are electrical diagrams of two different architectures for the example park e-securement system of FIG. 1 according to the principles of the present application.

As previously mentioned, park electronic securement (e-securement) issues could potentially occur when a battery electric vehicle (BEV) is in drive/neutral/reverse and there is an electrical system malfunction that prevents a park pawl system from being controlled. Conventional solutions to this problem include the addition of excess hardware, such as additional electric motor(s) and spring loads, but this could drastically increase costs and causes packaging/weight issues, which could be particularly problematic for lighter weight BEVs with less powerful propulsion systems.

Accordingly, improved park e-securement systems and methods are presented. In a first embodiment, a park e-securement system provides for park e-securement via the park pawl system or a separate electric park brake (EPB) during a plurality of different electrical system malfunctions. In this first embodiment, this is achieved with no additional hardware by stepping-down a voltage from the high voltage battery of the BEV using its direct current to direct current (DC-DC) converter, thereby providing a redundant power source voltage (e.g., in place of the low voltage battery of the BEV) at no additional costs. In a second embodiment, this is achieved with a separate low voltage backup battery and battery charger at slightly increased costs and packaging size/weight.

Referring now to FIG. 1, a functional block diagram of a BEV 100 having an example park e-securement system according to the principles of the present application is illustrated. The BEV 100 generally comprises an electrified powertrain 104 configured to generate (via an electric drive module, or EDM) drive torque to a driveline 108 for propulsion. It will be appreciated that the electrified powertrain 104 could have other suitable configurations. The electrified powertrain 104 generally comprises one or more electric motors 112, a high voltage battery system 116 for powering the electric motor(s) 112, and a DC-DC converter 120. While the DC-DC converter 120 is generally shown as part of the electrified powertrain 104, it will be appreciated that the DC-DC converter 120 could be located separately from the electrified powertrain 104. An electrified vehicle control unit (EVCU) 124 is configured to control operation of the BEV 100.

One primary control aspect of the EVCU 124 is to control the electrified powertrain 104 to generate a desired amount of drive torque to meet a driver demand (e.g., input via an accelerator pedal). The EVCU 124 is typically powered by a low voltage battery 128, which could also be utilized to power one or more accessory loads 132 of the BEV 100. Another control aspect of the EVCU 124 is that it comprises a power inverter module (PIM) 136 (e.g., switches/relays for generating control signal(s)) for command of a park pawl system 140 of the BEV 100.

In one exemplary implementation, the park pawl system 140 comprises an actuator (e.g., an electric motor) that, in response to signal(s) generated by the PIM 136 to drive a threaded spindle (e.g., supported by a ball bearing) on which a threaded nut is mounted, and the threaded nut is rotationally fixed by a sleeve and moves in a direction of the actuator and releases a cone that is pre-loaded by a compression spring, and the cone pushes a park pawl thereby rotating it around a pin towards a park lock wheel (e.g., a toothed wheel) to lockup the driveline 108 and transition the BEV 100 to a "park state" (fully stopped and e-secured).

The high voltage battery 116, the DC-DC converter 120, and the low voltage battery 128 are also generally referred to as an electrical system 148 of the BEV 100. For example, the electrical system 148 could comprise the high and low voltage buses connected to these devices with the DC-DC converter 120 operating therebetween. There are a plurality of different electrical system malfunctions that could occur in the BEV 100, which will now be described in greater detail. In some of these malfunction scenarios, the park pawl system 140 may be unable to be adequately controlled/commanded by the EVCU 124. In these cases, as will be described more fully below, the EVCU 124 could actuate a separate electric park brake 144 via a brake system module (BSM) 148 that applies braking force to stop the driveline 108 (but does not physically lock it up like the park pawl system 140). For this reason, the e-securement systems and methods of the present application could be limited to lighter weight BEVs where the maximum weight (BEV+maximum expected load, or a "worst-case" scenario) would be able to be held stationary by the electric park brake 144, even on a steep grade/hill. For heavier BEV applications, the electric park brake 144 alone could be insufficient for this.

Figure 2B:
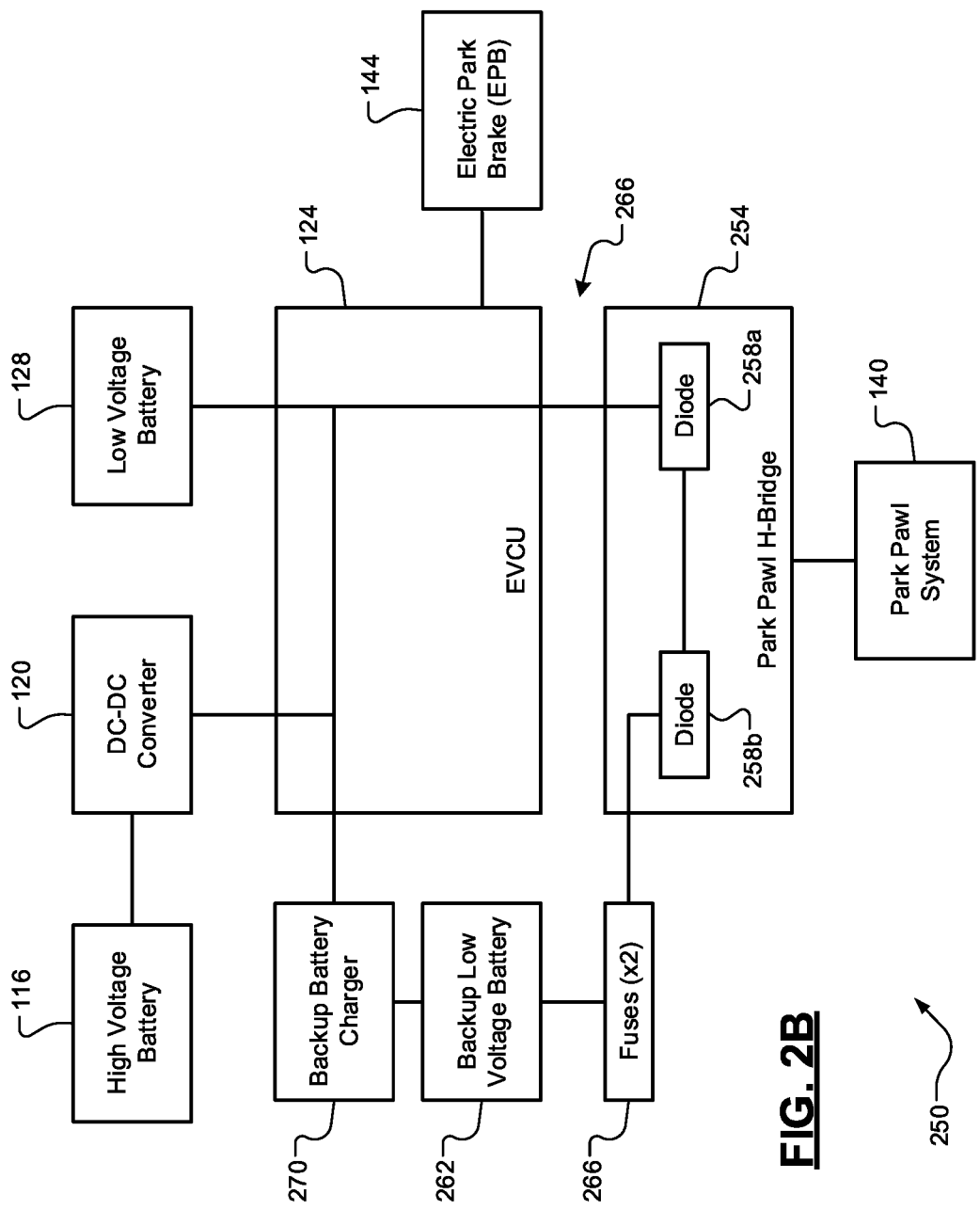

Referring now to FIGS. 2A-2B, electrical diagrams of two different architectures 200, 250 for the example park e-securement system of FIG. 1 according to the principles of the present application are illustrated. In FIG. 2A, there is no additional hardware required as previously described. This architecture 200 comprises a park pawl H-bridge 204 including four metal-oxide semiconductor field-effect transistors (MOSFETs) 208 (e.g., N-type MOSFETs) that connect between the park pawl system 140 and two half-bridges bridges of the EVCU 124. In one exemplary implementation, the park pawn H-bridge is configured to allow for separate or isolated powering of the park pawl system 140 during the various malfunction scenarios described herein. An isolating fuse 212 (e.g., ~200 amperes) is disposed between these two bridges external to the EVCU 124 (e.g., in a power distribution center, or PDC) for electrical isolation. As previously discussed, there are a plurality of different electrical system malfunctions that could occur, which will now be discussed in greater detail.

In a first example malfunction, an open or broken connection 216 between the EVCU 124 and the park pawl system 140 occurs. During this malfunction, the BEV 100 is still capable of continued driving, but the park pawl system 140 would otherwise not be engaged once the BEV 100 is stopped. Because this connection 216 is open or broken, no reliable communication to the park pawl system 140 is achievable. Thus, the EVCU 124 in this malfunction scenario would command the electric park brake 144 to engage for park e-securement.

In a second example malfunction, there is a short (e.g., 12 volts to ground) at or near the connection 216, thereby resulting in the EVCU 124 losing power if only the low voltage battery 128 were present and cause the BEV 100 to lose propulsion as no power is fed to EVCU 124 and the BEV 100 would coast down. The park pawl system 140 also would not get engaged once the BEV 100 is stopped, and there again would be no reliable form of securement because the EVCU 124 (with no power) would be unable to control the park pawl system 140. However, the redundant power source voltage from the DC-DC converter 120 is able to keep the EVCU 124 powered and functional for park e-securement.

In a third example malfunction, there is a short (e.g., 12 volts to ground) in the whole BEV 100, during which the park e-securement system will still maintain functionality via the redundant power source voltage as described with respect to the second example malfunction scenario. In the architecture 250 of FIG. 2B, in contrast to FIG. 2A, there is some additional hardware required—a low voltage backup battery 262, two fuses 266, and a backup battery charger 270. This architecture 250 will function the same way as the architecture 200 of FIG. 2A with respect to the various example electrical system malfunction scenarios described above (e.g., open/broken connection 266 or other 12 volt to ground short), but at the cost of slightly increased costs (due to additional hardware) and packaging/weight.

In the illustrated architecture 250, the park pawl H-bridge 254 comprises diodes 258a, 258b for the two bridges as the currents are lesser compared to the architecture of FIG. 2A. The DC-DC converter 120 is able to provide electrical energy to power the backup battery charger 270 to keep the low voltage backup battery 262 charged, which provides power to the H-bridge 254 via two fuses 266. As previously discussed, the increased cost and packaging size/weight could be undesirable, particularly for compact lighter weight BEVs.

Figure 3:
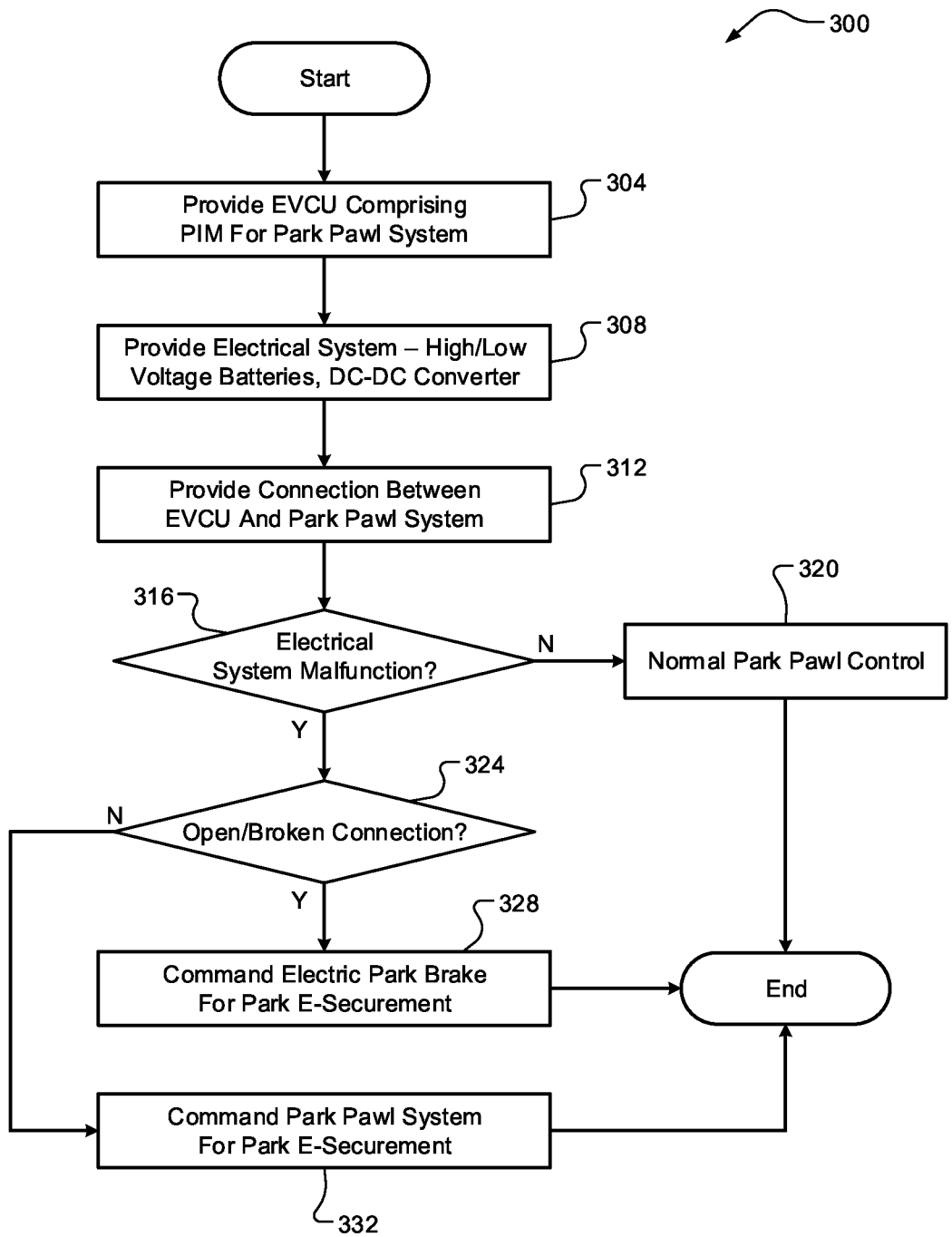
FIG. 3 is a flow diagram of an example park e-securement method for a BEV capable of operation during a plurality of different electrical system malfunctions according to the principles of the present application.

Referring now to FIG. 3, an example park e-securement method 300 for a BEV capable of operation during a plurality of different electrical system malfunctions according to the principles of the present application is illustrated. While the BEV 100 and its components are specifically referenced for illustrative/descriptive purposes, it will be appreciated that the method 300 could be applicable to any suitable BEV. At 304, the EVCU 124 comprising the PIM 136 for control of the park pawl system 140 is provided. At 308, the electrical system 148 comprising (i) the high voltage battery 116, (ii) the DC-DC converter 120, and (iii) the low voltage battery 128 is provided. At 312, the connection 216/266 between the EVCU 124 and the park pawl system 140 is provided.

At 316, a determination is made whether at least one of the plurality of malfunctions of the electrical system 148 are present. When false, the method 300 proceeds to 320 where normal control of the park pawl system 140 continues (e.g., because there is no 12 volt power loss from the low voltage battery 128) and the method 300 ends. When true, at 324 a determination is made whether the malfunction(s) include an open/broken connection 216/266. When true, the method 300 proceeds to 328 where the EVCU 124, powered by the redundant power source voltage from the DC-DC converter 120, commands the electric park brake 144 to engage thereby stopping the BEV 100 for park e-securement and the method 300 ends. When false, the method 300 proceeds to 332 where the EVCU, again powered by the redundant power source voltage from the DC-DC converter 120, commands (via the PIM 136) the park pawl system 140 to engage thereby stopping the BEV 100 for park e-securement and the method 300 ends.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A park electronic securement (e-securement) system for a battery electric vehicle (BEV), the system comprising:
   an electrical vehicle control unit (EVCU) configured to control operation of the BEV and comprising a power inverter module (PIM) for command of a park pawl system of the BEV;
   an electrical system comprising (i) a high voltage battery configured to power one or more electric motors of the BEV, (ii) a DC-DC converter configured to step-down a voltage of the high voltage battery to a redundant power source voltage, and (iii) a low voltage battery configured to power at least the EVCU; and
   a connection between the EVCU and the park pawl system;
   wherein the EVCU is configured to:
      when there is at least one of a plurality of malfunctions of the electrical system, receive power from the redundant power source voltage and command either the park pawl system or an electric park brake to transition the BEV to a park state; and
      when there are none of the plurality of malfunctions of the electrical system, receive power from the low voltage battery for control of the park pawl system to transition the BEV to the park state when requested.

2. The system of claim 1, wherein the EVCU is configured to command the electric park brake to transition the BEV to the park state when one of the plurality of electrical system malfunctions is present indicating the connection between the EVCU and the park pawl system is open or broken.

3. The system of claim 1, wherein the EVCU is configured to control the PIM to command the park pawl system to transition the BEV to the park state when one of the plurality of electrical system malfunctions is present indicating a ground short at the connection between the EVCU and the park pawl system.

4. The system of claim 1, wherein the EVCU is configured to control the PIM to command to the park pawl system to transition the BEV to the park state when one of the plurality of electrical system malfunctions is present indicating a ground short of the entire BEV.

5. The system of claim 1, wherein the connection comprises an H-bridge between the EVCU and the park pawl system, the H-bridge comprising four metal-oxide semiconductor field-effect transistors (MOSFETs).

6. The system of claim 5, further comprising an isolating fuse between the first and second bridges.

7. The system of claim 6, wherein the isolating fuse is an approximately 200 ampere fuse.

8. The system of claim 1, wherein the redundant power source voltage and a voltage of the low voltage battery are each approximately 12 volts.

9. A park electronic securement (e-securement) method for a battery electric vehicle (BEV), the method comprising:
providing an electrical vehicle control unit (EVCU) configured to control operation of the BEV and comprising a power inverter module (PIM) for command of a park pawl system of the BEV;
providing an electrical system comprising (i) a high voltage battery configured to power one or more electric motors of the BEV, (ii) a DC-DC converter configured to step-down a voltage of the high voltage battery to a redundant power source voltage, and (iii) a low voltage battery configured to power at least the EVCU;
providing a connection between the EVCU and the park pawl system;
detecting, by the EVCU, whether at least one of a plurality of malfunctions of the electrical system are present;
when there is at least one of a plurality of malfunctions of the electrical system, receiving, by the EVCU, power from the redundant power source voltage and commanding, by the EVCU, either the park pawl system, via the PIM, or an electric park brake to transition the BEV to a park state; and
when there are none of the plurality of malfunctions of the electrical system, receiving, by the EVCU, power from the low voltage battery for controlling, by the EVCU of the park pawl system to transition the BEV to the park state when requested.

10. The method of claim 9, further comprising commanding, by the EVCU, the electric park brake to transition the BEV to the park state when one of the plurality of electrical system malfunctions is present indicating the connection between the EVCU and the park pawl system is open or broken.

11. The method of claim 9, further comprising commanding, by the EVCU via the PIM, the park pawl system to transition the BEV to the park state when one of the plurality of electrical system malfunctions is present indicating a ground short at the connection between the EVCU and the park pawl system.

12. The method of claim 9, further comprising commanding, by the EVCU via the PIM, the park pawl system to transition the BEV to the park state when one of the plurality of electrical system malfunctions is present indicating a ground short of the entire BEV.

13. The method of claim 9, wherein the connection comprises an H-bridge between the EVCU and the park pawl system, the H-bridge comprising four metal-oxide semiconductor field-effect transistors (MOSFETs).

14. The method of claim 13, further comprising providing an isolating fuse between the first and second bridges.

15. The method of claim 14, wherein the isolating fuse is an approximately 200 ampere fuse.

16. The method of claim 9, wherein the redundant power source voltage and a voltage of the low voltage battery are each approximately 12 volts.

\* \* \* \* \*